(12) United States Patent
Lewis et al.

(10) Patent No.: US 6,519,061 B1
(45) Date of Patent: Feb. 11, 2003

(54) TRAFFIC SWITCHING BETWEEN DIFFERENT WAVELENGTH MULTIPLEXED CHANNELS IN OPTICAL COMMUNICATIONS SYSTEMS

(75) Inventors: David O Lewis, Stratford upon Avon (GB); Robert C Goodfellow, Northants (GB)

(73) Assignee: Marconi Communications Limited, Coventry (GB)

(*) Notice: Subject to any disclaimer, the term of this patent is extended or adjusted under 35 U.S.C. 154(b) by 0 days.

(21) Appl. No.: 09/391,758

(22) Filed: Sep. 8, 1999

(30) Foreign Application Priority Data

Jul. 15, 1999 (GB) .............................................. 9916578

(51) Int. Cl.[7] .............................................. H04J 14/02
(52) U.S. Cl. ........................ 359/127; 359/137; 370/223
(58) Field of Search ................................ 359/127, 123, 359/124, 128, 139, 137; 370/223, 395

(56) References Cited

U.S. PATENT DOCUMENTS

| | | | | |
|---|---|---|---|---|
| 5,416,625 A | * | 5/1995 | Cavaciuti et al. ........... | 359/137 |
| 5,475,679 A | * | 12/1995 | Munter ........................ | 370/395 |
| 5,589,967 A | * | 12/1996 | Auffret ........................ | 359/123 |
| 6,198,721 B1 | * | 3/2001 | Mueller ........................ | 370/223 |

FOREIGN PATENT DOCUMENTS

WO    WO 98/15861    4/1998

OTHER PUBLICATIONS

*Quantifying the benefit of wavelength add–drop in WDM rings with distance–independent & dependent traffic*, Simmons, J., et al., J. Lightwave Technology, vol. 17, No. 1, Jan. 1999, pp. 48–57.

* cited by examiner

Primary Examiner—John Tweel
(74) Attorney, Agent, or Firm—Kirschstein, et al.

(57) ABSTRACT

An optical communications system for communication of a plurality of wavelength multiplexed channels. The communications system comprises a node. The node comprises a plurality of add-drop multiplexers (ADM), one per channel. Each ADM comprises a tributary. The ADMs are interconnected by the tributaries.

21 Claims, 4 Drawing Sheets

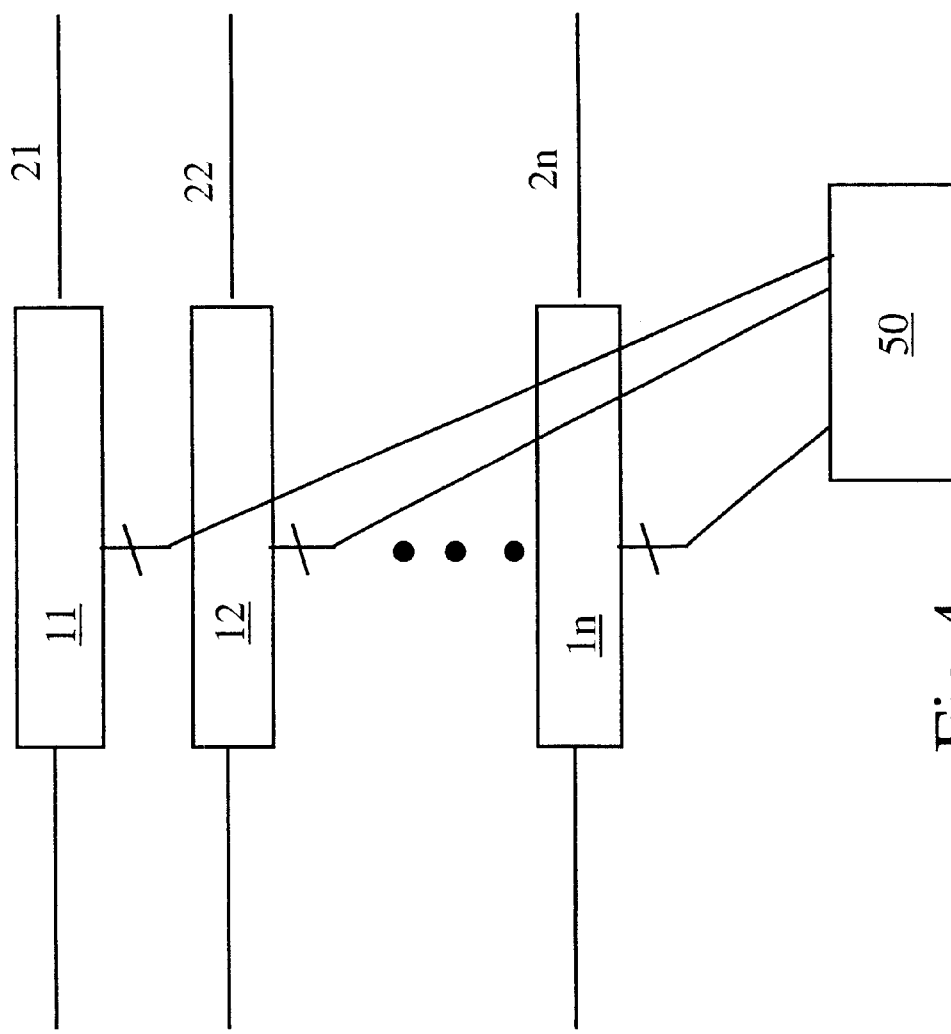

TRAFFIC SWITCHING BETWEEN DIFFERENT WAVELENGTH MULTIPLEXED CHANNELS IN OPTICAL COMMUNICATIONS SYSTEMS

BACKGROUND OF THE INVENTION

The present invention relates to the field of wavelength multiplexed optical communications systems and, in particular, to systems for the switching of traffic between different wavelength multiplexed channels.

Optical communications systems are a substantial and fast-growing constituent of communications networks. The expression "optical communications system", as used herein, relates to any system that uses optical signals to convey information across an optical medium. Such optical systems include, but are not limited to, telecommunications systems, cable television systems, local, metropolitan and wide area networks (LANs, MANs and WANs). Optical systems are described in Gowar, Ed. *Optical Communications Systems*, (Prentice Hall, New York). Currently, the majority of optical communication systems are configured to carry a single optical channel in a relatively broad wavelength spectral band over an optical path consisting of one, or a series of, optical guides. To convey increased quantities of information, e.g. from a plurality of sources, wavelength division multiplexing (WDM) is now used. In a WDM system a plurality of optical signals, each typically having a narrow wavelength spectral band, each band being centered on a different wavelength, are carried over a single optical guide. Here "optical guide" is used to describe any suitable optical medium, including optical fibres and optical waveguides.

WDM is usually used in combination with established time division multiplexing (TDM) techniques. Hence each WDM channel will typically be used for the transport of a plurality of different messages multiplexed together in the time domain. An add-drop multiplexer (ADM) provides a low cost means for accessing all or a part of the TDM traffic forming a data stream passing along a communications link, such as an optical guide. The traffic passing through the ADM does so via "line ports". Data or messages passing along the communications link are selectively time demultiplexed by switching circuitry in the ADM and passed via so-called tributary ports to their destination. Similarly, data or messages for adding to the communications link are fed to the ADM via the tributary ports and are time multiplexed into the message stream by the ADM switching circuitry. This switching and multiplexing function is performed in the electrical domain. In order to interface to an optical bearer, the ADM includes photo-detectors and laser signal generators.

Currently optical communications networks are made up of rings or meshes comprising electrical repeater/ regenerator/ add/drop electronics linked together by means of optical communications links. These links typically comprise optical fibre. In order to interface to the optical link, the nodes include a laser-based transmitter (electrical to optical converter) and a broad optical-band receiver (optical to electrical converter). WDM is currently becoming established for long haul line systems but has not penetrated the feeder network A 'feeder network' connects and gathers and consolidates traffic from users and delivers it to the MANs, WANs and LANs e.g. the Access network could be a 'feeder network'. The feeder network is made up of electronic nodes incorporating some switching capability, normally in the form of an electronic ADM. Typically these nodes are designed to handle digital traffic according to the SDH or SONET telecommunications standard protocols but also increasingly ATM and IP protocols are becoming established. At those regions of the network that experience particularly high traffic, the node and path capacities are increased by upgrading these regions to handle higher rate TDM signals e.g. 155 Mbit/s SDH and SONET standards (STM-1) are used widely and 622 Mbit/s (STM-4), 2.4 Gbit/s (STM-16) and 10 Gbit/s (STM-64), are used where necessary.

With the current steep rise in demand for communications there is a need to provide yet greater capacity. The installed optical fibre base will require to be further extended or exploited. The high cost of laying fibre means there is a drive to increase the signalling TDM rate as far as possible and to utilize fully the installed fibres.

As it becomes necessary to run traffic over multiple WDM channels in parallel, new switching needs arise, i.e. when traffic running through one channel is required to couple through another. In addition, the increased switching requirement per node will necessitate additional ADMs per node, with typically one ADM being provided per WDM channel.

With the introduction of optical multiplexers and demultiplexers within these linked networks of ADMs, a single fibre may be used to handle multiple WDM channels so that the net capacity of the segments is enhanced—means to achieve this are described in copending U.S. patent application Ser. No. 09/381,763 in the name of Marconi Communications, filed simultaneously herewith and entitled "Communications Systems," the entire contents of said application being incorporated herein by reference.

The upcoming situation where multiple rings may be collocated and may need to be connected to other multiple rings brings new requirements for the interconnection of ADMs at nodes. This development will drive the integration level, cost and incorporated switch size of ADMs and thereby the functionality and complexity of complete networks.

There is therefore a need for a more flexible way of transferring traffic between different channels of a wavelength multiplexed optical communications systems.

SUMMARY OF THE INVENTION

The present invention provides an optical communications system for communication of a plurality of wavelength multiplexed channels; in which the communications system comprises a node; in which the node comprises a plurality of add drop multiplex (ADM) means, one per channel; in which each ADM means comprises tributary means; in which the ADMs are interconnected by the tributary means.

The present invention also provides a method for switching individual time division multiplexed messages between wavelength multiplexed channels of an optical communications system, comprising the steps of arranging switch means comprising a plurality of add drop multiplex (ADM) means, one per wavelength multiplex channel; in which each ADM means comprises tributary means, the method comprising the steps of interconnecting the ADMs means via the tributary means.

The present invention also provides a method for switching individual time division multiplexed messages between a plurality of streams of time division multiplexed data; in which each stream of time division multiplexed data is comprised in a channel of a wavelength multiplexed optical communications system, the method comprising the steps of providing a node; providing the node with a plurality of add drop multiplex (ADM) means, one per wavelength multiplex channel; providing each ADM means with tributary means and interconnecting the ADM means via the tributary means.

The present invention also provides a means for switching individual messages between a plurality of streams of time division multiplexed (TDM) data in a wavelength multiplexed optical communications system, the system for communication of a plurality of wavelength multiplexed channels; in which each channel comprises one of the streams of TDM data; in which the means comprises switch means; in which the switch means comprises a plurality of add drop multiplex (ADM) means, one per channel; in which each ADM means comprises tributary means; in which the ADMs are interconnected by the tributary means.

BRIEF DESCRIPTION OF THE DRAWINGS

Embodiments of the present invention will now be described by way of example with reference to the drawings in which

FIG. 4 shows a part of a WDM optical communications system according to a further embodiment of the present invention.

DETAILED DESCRIPTION OF THE PREFERRED EMBODIMENTS

Figure 1:
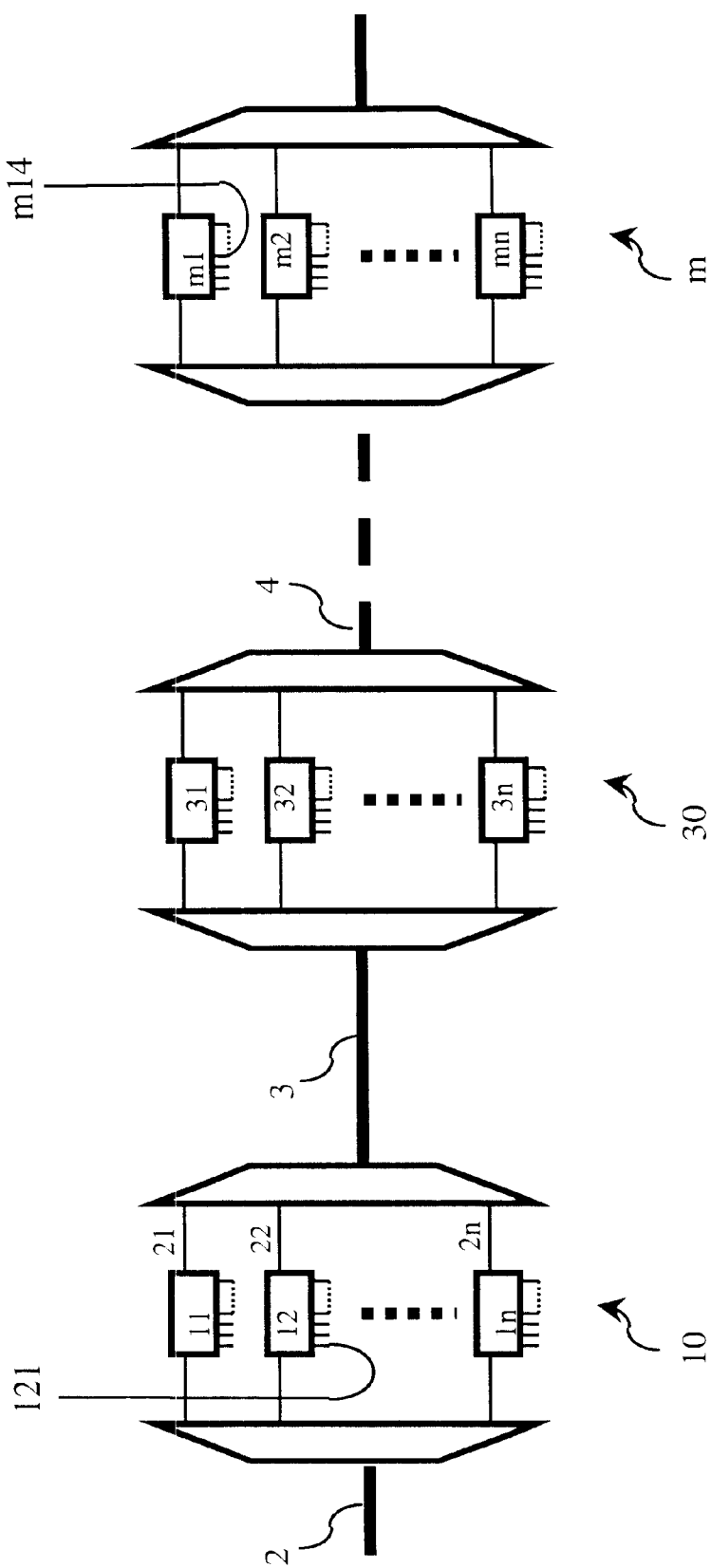
FIG. 1 shows a WDM optical communications system of the prior art.

FIG. 1 shows a WDM optical communications system of the prior art comprising an optical communications path, e.g. an optical fibre comprising sections 2, 3, 4, . . . where successive sections of fibre are joined by switch means 10, 30, m. Each switch means comprises a plurality of add-drop multiplexers 11, 12, . . . In; 31, 32, . . . 3n; m1, m2, . . . mn; each ADM provided with a plurality of add-drop tributaries 31, 32, . . . 3n (see FIG. 2).

Figure 2:
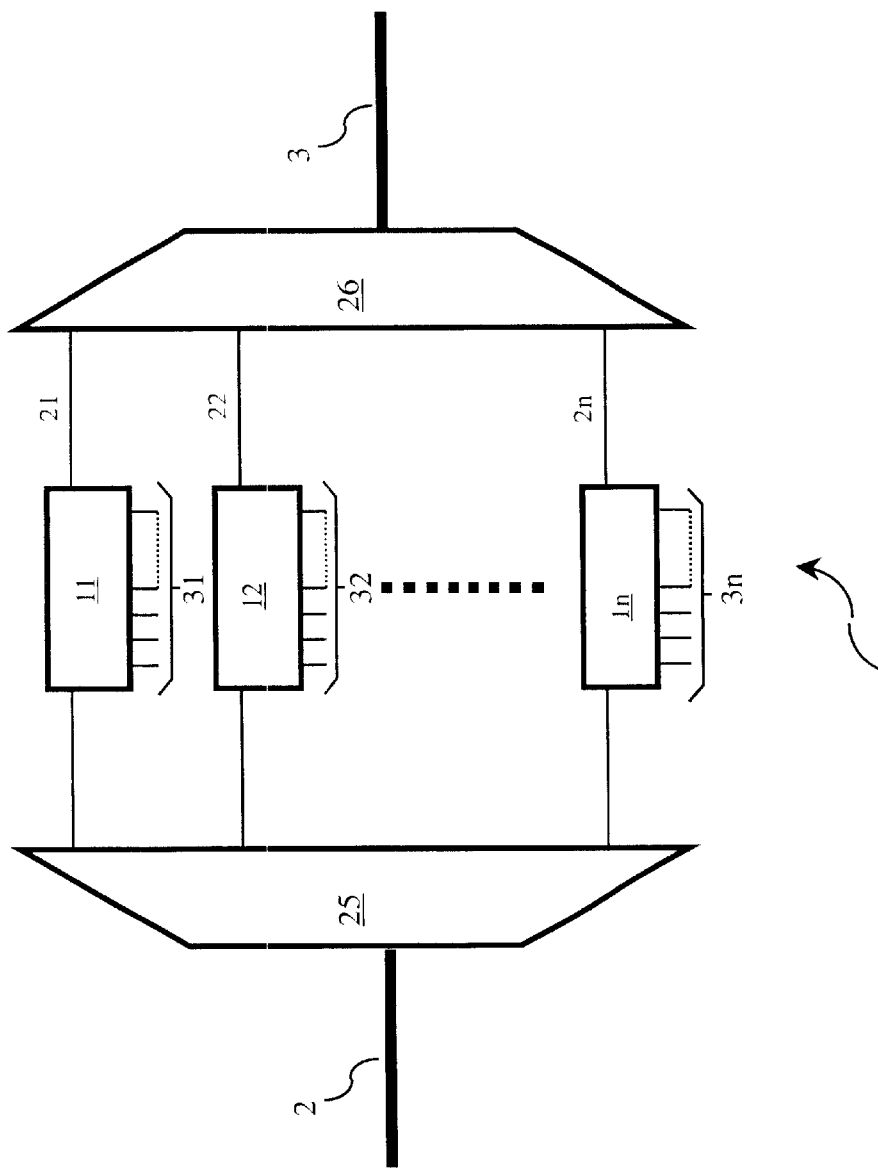
FIG. 2 shows the system of FIG. 1 in more detail.

The WDM optical path 2, 3, 4, . . . carries several optical channels by WDM, i.e. in which each channel occupies a different part of the spectrum. As shown in FIG. 2, each of switch means 10, 30, . . . m comprises an optical demultiplexer 25. Optical demultiplexer 25 separates each of the WDM channels received over the WDM optical path 2, 3, 4 . . . into a different one of individual optical guides 21, 22, . . . 2n. Each one of individual optical guides 21, 22, . . . 2n feeds into a different one of ADMs 11, 12, . . . in (in the case of switching node 10) where appropriate add/drop functions are performed, as described above. Each of switching nodes 10, 30, . . . m also comprises an optical multiplexer 26. Optical multiplexer 26 re-multiplexes the outputs of each one of ADM's 11,12, . . . 1n back into optical path 2, 3, 4 . . .

As indicated above, one problem with the conventional arrangement arises if a source of a message 121 (see FIG. 1) is in communication with an ADM that is connected to a first one of the optical channels, say the $\lambda_1$ channel, and the intended destination m14 is connected to a switching node m that does not receive the $\lambda_1$ channel, but only the $\lambda_2$, $\lambda_3$ and $\lambda_4$ channels. This even though all four channels, $\lambda_1$, $\lambda_2$, $\lambda_3$ and $\lambda_4$ run through the same optical guide for part of their lengths.

In order to allow messages on the $\lambda_1$ channel to be received on a different channel, say $\lambda_2$, it has been necessary in the past to insert a colorizing transponder which is capable of receiving a signal on the $\lambda_1$ channel and transmitting it on the $\lambda_2$ channel en bloc. Such a transponder comprises a photo detector sensitive in a wave band that includes $\lambda_1$ (but may include all WDM wavelengths) and a high precision laser that transmits accurately in the $\lambda_2$ waveband. Such transponders are expensive and their use results in the entire content of the $\lambda_1$ channel being transferred to the $\lambda_2$ channel whereas, typically, only a single message may need to be so transferred requiring an additional switching function to select the correct message for transfer between channels. This is what is currently done in the PMA8 photonic multiplexer from Marconi Communications. A need is now developing that was not apparent previously for an economical way to switch with fine granularity between WDM optical channels.

Figure 3:
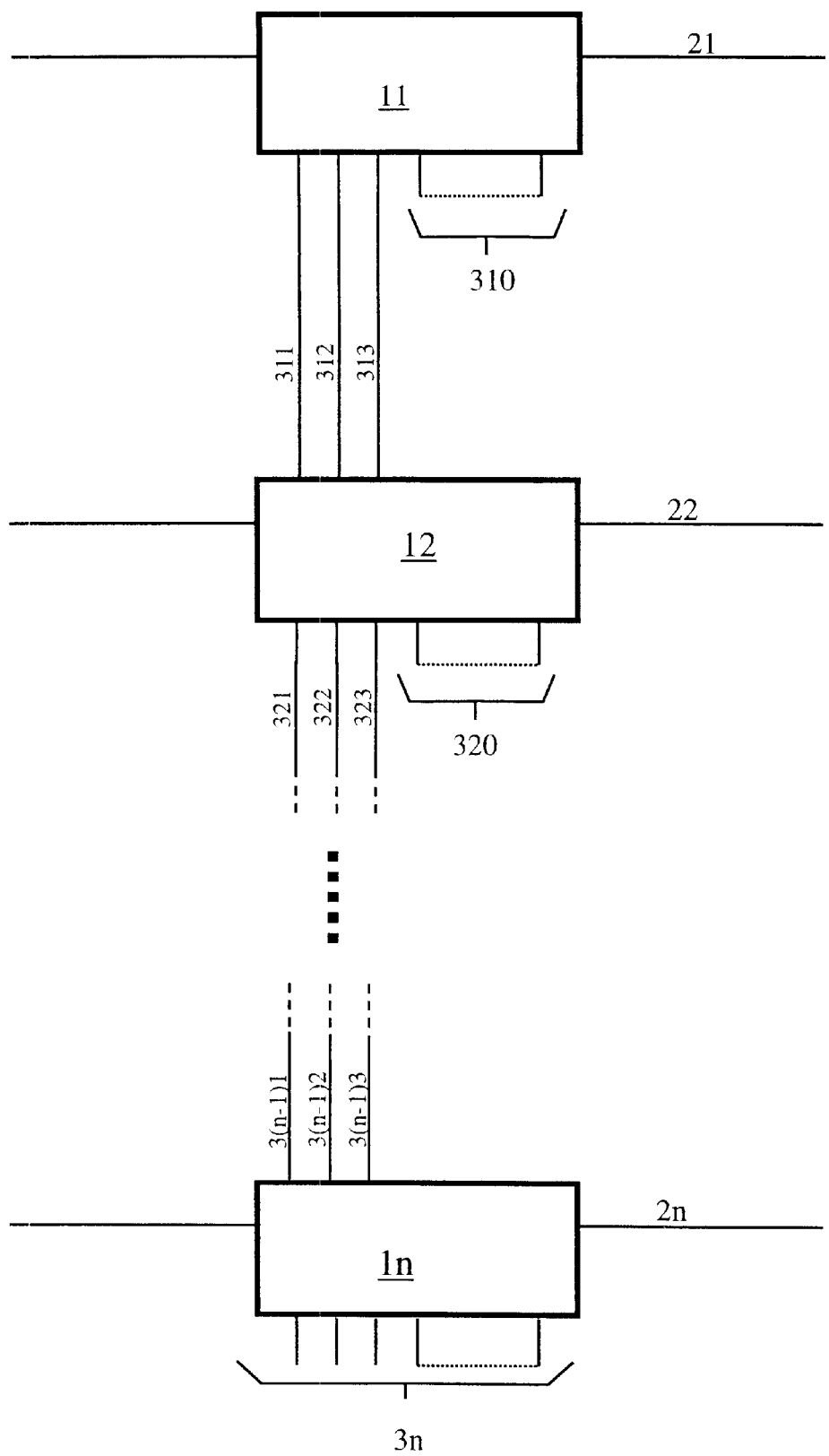
FIG. 3 shows a part of a WDM optical communications system according to an embodiment of the present invention.

FIG. 3 shows a part of a switching node according to the present invention. In FIG. 3 the ADMs 11, 12, . . . 1n of switching node 10 are shown in more detail. In particular, the tributary connections 31, 32, 3n associated with each ADM are shown separated into two sub-groups. A first sub-group 311, 312, 313 from first ADM 11 are taken to the next ADM 12, thus allowing interchange of demultiplexed messages there-between. A second sub-group 310 from first ADM 11 function as before to communicate demultiplexed messages to users and to input messages from users to the ADM for multiplexing.

In a similar way a sub-group 321, 322, 323 from second ADM 12 are taken to third ADM (not shown). This is repeated so that each ADM is interconnected via a sub-group of tributary connections to the next ADM until the penultimate ADM (not shown) has tributary connections 3(n–1)1, 3(n–1)2, 3(n–1)3 taken to the last ADM In of switch node 10.

According to this so-called "daisy chain" arrangement, each ADM is arranged to pass on messages received from an adjacent ADM via the tributary connections but intended for another ADM further along the "daisy chain" until that destination ADM is reached. On receiving a message via the tributary connections that is intended for a channel handled by that ADM, the ADM will remultiplex it into the message stream for that channel in a similar way to messages received from users via conventional tributary inputs.

Hence the switch node of FIG. 3 advantageously allows messages from a first WDM channel to be converted to the electrical domain, demultiplexed using the conventional ADM circuitry and to be passed in its demultiplexed, electrical state to a selected other one of the ADMs of that switch node where it is multiplexed into the data stream of a second WDM channel using the conventional ADM circuitry and converted back into the optical domain in the appropriate waveband for the second WDM channel. Advantageously, messages of any level of granularity handled by the ADMs may be switched in this way.

Although the illustration of FIG. 3 shows a "daisy chain" interconnection of the ADMs of a node, other interconnection patterns may be used according to preferred embodiments of the present invention, including a full mesh or partial, "nearest neighbors" mesh or ring. This interconnection may be implemented within a node in such a way that effective interconnectivity can be achieved in an incremental fashion as the equipping of a node progresses to accommodate increased traffic demand, e.g. by adding extra ADMs to a node as and when required.

According to the embodiment of FIG. 4, the relevant tributaries could be interconnected via a separate switch unit 50 designed to provide the required switch connections and capacity.

Preferably switch unit 50 is non-blocking. Non Blocking means that any connection from a first input $I_i$ to a first output $O_j$ cannot prevent any other connection from a different input $I_p$ to a different output $O_q$ being completed. Switch 50 could also be incrementally upgradable. This new switch element may be managed within an enhanced network management system.

It may be desirable not to collocate all the ADMs of a node because of space constraints in current exchange buildings so that the interconnection of the tributaries 311, 312, 313, etc. of FIG. 3 may entail the distribution of digital data over relatively long distances. According to a further preferred embodiment of the present invention, optical fibre interconnections utilising WDM principles are applied to the interconnection of the ADM tributaries. As TDM rates and the number of tributary interconnections increase, switch 50 may provide optical matrix switching to switch messages between interconnected tributaries, according to a further embodiment.

We claim:

1. An optical communications system for communication of a plurality of wavelength multiplexed channels; in which the communications system comprises a node; in which the node comprises a plurality of add drop multiplex (ADM) means, one per channel; in which each ADM means comprises tributary means; in which the ADM means are interconnected by the tributary means; and in which each ADM means comprises switching means for switching individual messages between the wavelength channels.

2. The communications system as claimed in claim 1 comprising a single optical guide for transmission of the plurality of wavelength multiplexed channels.

3. The communications system as claimed in claim 1 comprising a plurality of optical guides for transrission of the plurality of wavelength multiplexed channels between the node and an adjacent node.

4. The communications system as claimed in claim 1 in which the tributary means interconnect the ADM means in the form of a daisy chain.

5. The communications system as claimed in claim 1 in which the tributary means interconnect the ADM means in the form of a mesh.

6. The communications system as claimed in claim 1 in which the tributary means interconnect the ADM means in the form of a ring.

7. The communications system as claimed in claim 1 comprising electrical non-blocking switch means for interconnecting the ADM means.

8. The communications system as claimed in claim 1 in which the tributary means comprise electrical to optical converter means, optical guide means and optical to electrical converter means for interconnecting the ADM means.

9. The communications system as claimed claim 8 in which the tributary means comprise optical switch means for interconnecting the ADM means.

10. A method for switching individual messages between wavelength channels of a wavelength multiplexed optical communications system, comprising the steps of arranging switch means comprising a plurality of add drop multiplex (ADM) means, one per wavelength multiplex channel; in which each ADM means comprises tributary means, the method comprising the step of interconnecting the ADM means via the tributary means.

11. A method for switching individual messages between a plurality of streams of time division multiplexed data; in which each stream of time division multiplexed data is comprised in a channel of a wavelength multiplexed optical communications system, the method comprising the steps of providing a node; providing the node with a plurality of add drop multiplex (ADM) means, one per wavelength multiplex channel; providing each ADM means with tributary means and interconnecting the ADM means via the tributary means.

12. A means for switching individual messages between a plurality of streams of time division multiplexed (TDM) data in a wavelength multiplexed optical communications system, the system for communication of a plurality of wavelength multiplexed channels; in which each channel comprises one of the streams of TDM data; in which the means comprises switch means; in which the switch means comprises a plurality of add drop multiplex (ADM) means, one per channel; in which each ADM means comprises tributary means; in which the ADM means are interconnected by the tributary means.

13. The means as claimed in claim 12 comprising a single optical guide for transmission of the plurality of wavelength multiplexed channels.

14. The means as claimed in claim 12 comprising a plurality of optical guides for transmission of the plurality of wavelength multiplexed channels between the node and an adjacent node.

15. The means as claimed in claim 12 in which the tributary means interconnect the ADM means in the form of a daisy chain.

16. The means as claimed in claim 12 in which the tributary means interconnect the ADM means in the form of a ring.

17. The means as claimed in claim 12 in which the tributary means interconnect the ADM means in the form of a mesh.

18. The means as claimed in claim 12 comprising electrical non-blocking switch means for interconnecting the ADM means.

19. The means as claimed in claim 12 in which the tributary means comprise electrical to optical converter means, optical guide means and optical to electrical converter means for interconnecting the ADM means.

20. The means as claimed claim 19 in which the tributary means comprise optical switch means for interconnecting the ADM means.

21. An optical communications system comprising a means for switching individual messages between a plurality of streams of time division multiplexed (TDM) data in a wavelength multiplexed optical communications system, the system for communication of a plurality of wavelength multiplexed channels; in which each channel comprises one of the streams of TDM data, in which the means comprises switch means; in which the switch means comprises a plurality of add drop multiplex (ADM) means, one per channel; in which each ADM means comprises tributary means; in which the ADMs are interconnected by the tributary means.

* * * * *